(12) United States Patent
Tanaka et al.

(10) Patent No.: US 9,002,128 B2
(45) Date of Patent: Apr. 7, 2015

(54) IMAGE PROCESSING APPARATUS, INTEGRATED CIRCUIT, PROGRAM, IMAGING APPARATUS, AND DISPLAY APPARATUS

(71) Applicant: Panasonic Intellectual Property Corporation of America, Torrance, CA (US)

(72) Inventors: Yoshiteru Tanaka, Fukuoka (JP); Ikuo Fuchigami, Fukuoka (JP); Tsuyoshi Nakamura, Fukuoka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 53 days.

(21) Appl. No.: 13/981,734

(22) PCT Filed: Dec. 26, 2012

(86) PCT No.: PCT/JP2012/008322
§ 371 (c)(1),
(2) Date: Jul. 25, 2013

(87) PCT Pub. No.: WO2013/136403
PCT Pub. Date: Sep. 19, 2013

(65) Prior Publication Data

US 2014/0063295 A1 Mar. 6, 2014

(30) Foreign Application Priority Data

Mar. 15, 2012 (JP) ................................. 2012-059079

(51) Int. Cl.
*G06K 9/40* (2006.01)
*H04N 5/262* (2006.01)
*G03B 15/00* (2006.01)
*G03B 35/08* (2006.01)
(Continued)

(52) U.S. Cl.
CPC .............. *H04N 5/2621* (2013.01); *G03B 15/00* (2013.01); *G03B 35/08* (2013.01);
(Continued)

(58) Field of Classification Search
USPC ........................... 382/254, 255, 239; 348/239
See application file for complete search history.

(56) References Cited

U.S. PATENT DOCUMENTS 6,409,598 B1 * 6/2002 Takeuchi ........................ 463/31
6,480,192 B1 * 11/2002 Sakamoto et al. ............ 345/419
(Continued)

FOREIGN PATENT DOCUMENTS

| JP | 7-121694 | 5/1995 |
|----|----------|--------|
| JP | 9-181966 | 7/1997 |
| JP | 2002-300373 | 10/2002 |
| JP | 2004-118384 | 4/2004 |
| JP | 2005-229198 | 8/2005 |
| JP | 2008-294785 | 12/2008 |

OTHER PUBLICATIONS

International Search Report issued Mar. 5, 2013 in International (PCT) Application No. PCT/JP2012/008322.

*Primary Examiner* — Yon Couso
(74) *Attorney, Agent, or Firm* — Wenderoth, Lind & Ponack, L.L.P.

(57) ABSTRACT

An image processing apparatus separates a captured image into a region of object (B) 1001B and a region of object (A) 1001A shallower than the region of object (B) 1001B in depth indicated by depth information, duplicates pixels constituting the region of object (B) 1001B and positioned in neighborhood of boundary between the region of object (B) 1001B and the region of object (A) 1001A, onto the neighborhood of the boundary outside the region of object (B) 1001B, thereby generating an extended region (B) 5001B, performs blur processing on the extended region (B) 5001B and the region of object (A) 1001A based on the depth of the region of object (A) 1001A indicated by the depth information, and after the processing, composites a value of each pixel constituting the extended region (B) 5001B and a value of one of pixels constituting the region of object (A) 1001A corresponding in position.

13 Claims, 18 Drawing Sheets

(51) Int. Cl.
*H04N 5/232* (2006.01)
*G06T 5/00* (2006.01)
*H04N 5/357* (2011.01)
*H04N 5/222* (2006.01)

(52) U.S. Cl.
CPC ......... *H04N 5/23229* (2013.01); *H04N 5/3572* (2013.01); *H04N 5/2226* (2013.01); *G06T 5/002* (2013.01); *G06T 2207/10028* (2013.01); *G06T 2207/20012* (2013.01)

(56) References Cited

U.S. PATENT DOCUMENTS

| | | | |
|---|---|---|---|
| 7,479,961 B2 * | 1/2009 | Yamaguchi et al. | 345/426 |
| 8,194,995 B2 * | 6/2012 | Wong et al. | 382/255 |
| 2002/0140823 A1 | 10/2002 | Sakurai et al. | |
| 2005/0195317 A1 | 9/2005 | Myoga | |
| 2014/0146999 A1 * | 5/2014 | Zeng | 382/103 |

\* cited by examiner

Region B having deeper depth indicated by depth information

Region A having shallower depth indicated by depth information

Boundary

Extended region

Radius of blur filter to be applied to region A

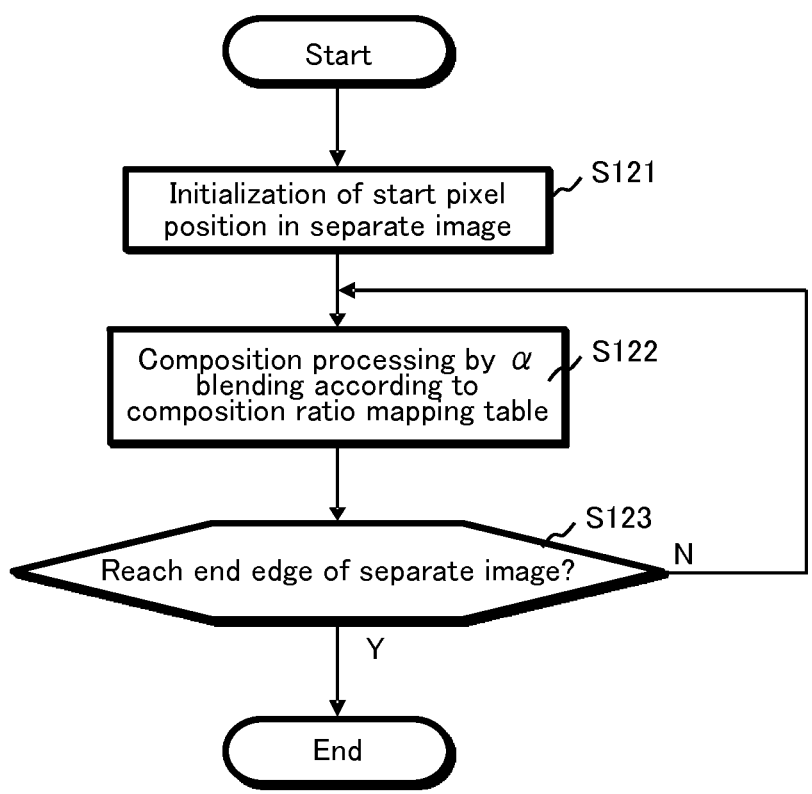

IMAGE PROCESSING APPARATUS, INTEGRATED CIRCUIT, PROGRAM, IMAGING APPARATUS, AND DISPLAY APPARATUS

TECHNICAL FIELD

The present invention relates to an image processing apparatus that generates an image having a lens blur effect added thereto.

BACKGROUND ART

Conventionally, in the case where an image is captured by a camera with a large-diameter lens, while a remarkable subject is focused on, an appropriate blur is added on purpose to other subject that is distant from the remarkable subject. Addition of such a blur achieves an effect of accentuating the remarkable subject, making the entire image to give a soft impression, and so on (blur effect).

It has been known to be more preferable that a hidden surface effect is taken into consideration for generating an image having a blur effect added thereto. An art has been proposed for generating a blurred image by lens with use of an image generated by a calculator, in consideration of a hidden surface effect (see Patent Literature 1 for example). FIG. 17 explains a principle disclosed in Patent Literature 1.

The hidden surface effect is one type of blur effect. According to this hidden surface effect, an image of a region that cannot reach an imaging surface through the center of a lens because of being behind an object is projected onto the imaging surface due to light diffraction along an outer edge of the lens resulting from light refraction by the lens. As shown in FIG. 18, a point C1 of a subject C is positioned in a region shielded by a subject B, and accordingly an image of the point C1 cannot reach an imaging surface through the center of a lens. However, the image of the point C1 is projected onto the imaging surface by being diffracted along an outer edge of the lens.

Here, according to the art disclosed in Patent Literature 1, an input image generated based on the pinhole camera model or the like and a depth image of the input image are acquired, (FIG. 17: Processing 11), and pixels to be influenced by a blur effect are calculated (Processing 12). Then, a direction of light incident on each pixel within a blur range is calculated (Processing 13), hidden surface processing is performed for each direction of light incident on the pixel (Processing 14), and an average of results of the processing is calculated as a pixel value to be output.

CITATION LIST

Patent Literature

[Patent Literature 1] Japanese Patent Application Publication No. H7-121694

SUMMARY OF INVENTION

Technical Problem

Since this conventional art is applied to the case where an image is acquired that is simulated by the pinhole camera model or the like in the field of computer graphics, it is possible to perform processing on a hidden part which is invisible from a point of view (hidden surface processing).

Here, considering the case where an image is actually captured. In the case where an image is actually captured by a camera with a large-diameter lens, no special problem is caused. On the other hand, in the case where an image is actually captured by a camera with a small-diameter lens, there is an extremely small light diffraction, unlike that shown in FIG. 18. Accordingly, a shielded region that is invisible from a point of view is extremely small even if being included in the captured image. Therefore, it is difficult to appropriately exhibit a hidden surface effect.

The present invention was made in view of the above problem, and aims to provide an image processing apparatus capable of adding a blur effect including a hidden surface effect to an actually captured image.

Solution to Problem

In order to solve the above problem, an image processing apparatus comprises: a separation unit configured to separate a captured image into a plurality of regions including a first region and a second region that is shallower than the first region in terms of depth indicated by depth information of the captured image; an extension unit configured to duplicate pixels that constitute the first region and are positioned in a neighborhood of a boundary between the first region and the second region, onto the neighborhood of the boundary outside the first region, thereby generating an extended region; a blur processing unit configured to perform blur processing on the extended region and the second region based on the depth of the second region indicated by the depth information; and a composition unit configured to, after the blur processing, composite a value of each of pixels constituting the extended region and a value of one of pixels constituting the second region that correspond in position with each other.

Advantageous Effects of Invention

With this structure, it is possible to add, to an actually captured image, a blur effect including a hidden surface effect.

BRIEF DESCRIPTION OF DRAWINGS

FIG. 12 is a flow chart of composition processing.

DESCRIPTION OF EMBODIMENTS

The following describes embodiments of the present invention with reference to the drawings.

(Embodiment 1)

Figure 1:
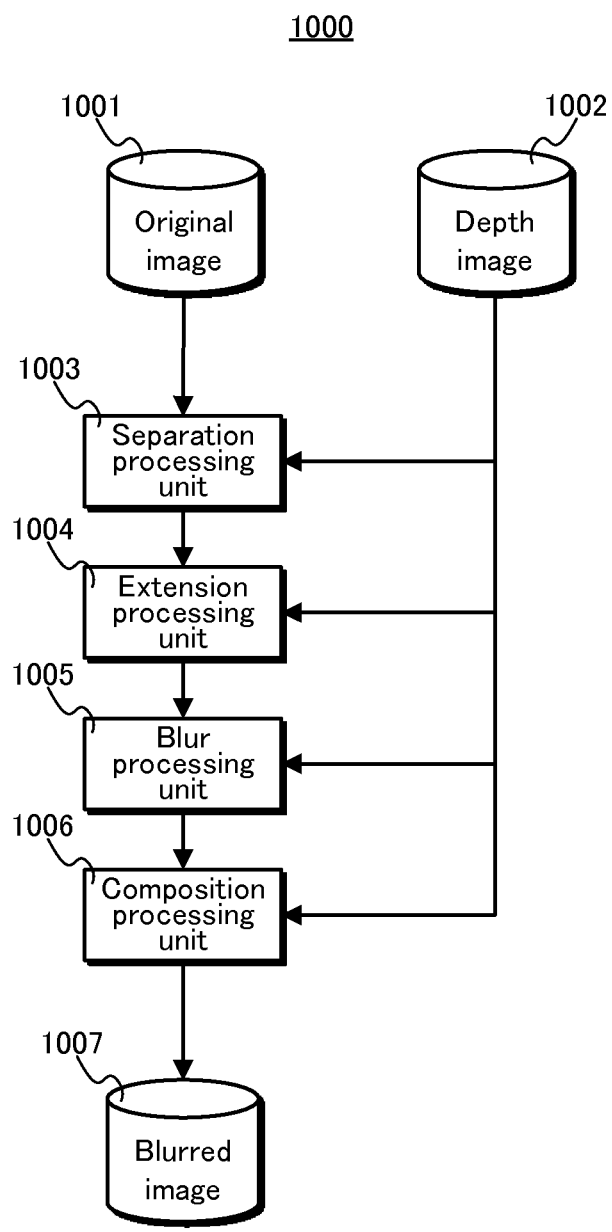
FIG. 1 is a block diagram showing an image processing apparatus relating to Embodiment 1.

FIG. 1 is a block diagram showing an image processing apparatus relating to Embodiment 1.

Figure 2:
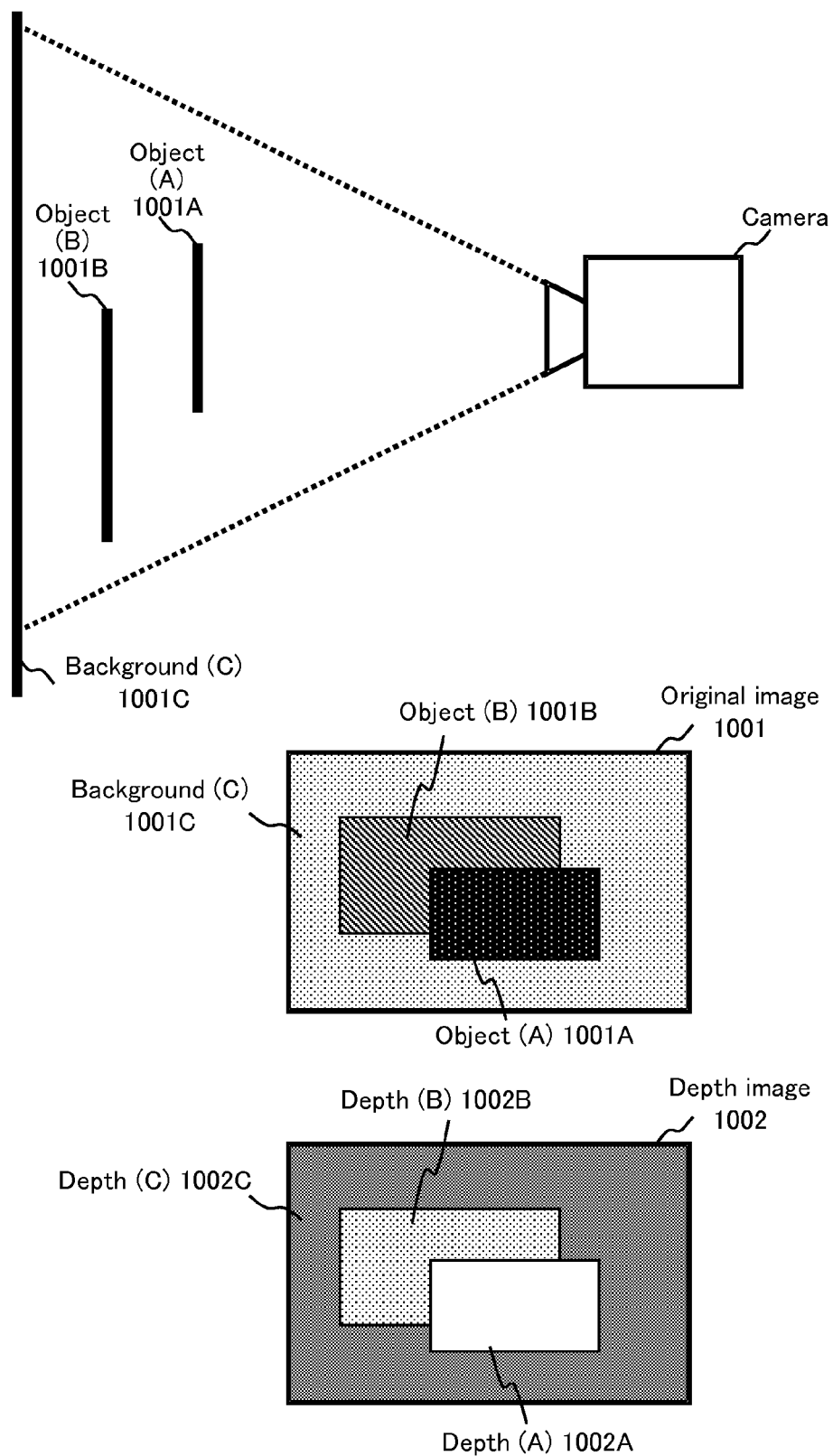
FIG. 2 shows a distance relation of each subject appearing in a captured image.

FIG. 2 shows a positional relation between each of objects and a camera exemplified in Embodiment 1, and an original image 1001 captured by the camera and a depth image 1002. The depth image 1002 is a so called a depth map, and includes depth information indicating a distance from the camera to each of the objects. The depth image 1002 indicates that the distance from the camera increases in order of a depth (A) 1002A, a depth (B) 1002B, and a depth (C) 1002C.

As shown in FIG. 1, the image processing apparatus 100 includes a separation processing unit 1003, an extension processing unit 1004, a blur processing unit 1005, and a composition processing unit 1006.

<Separation Processing>

Figure 3:
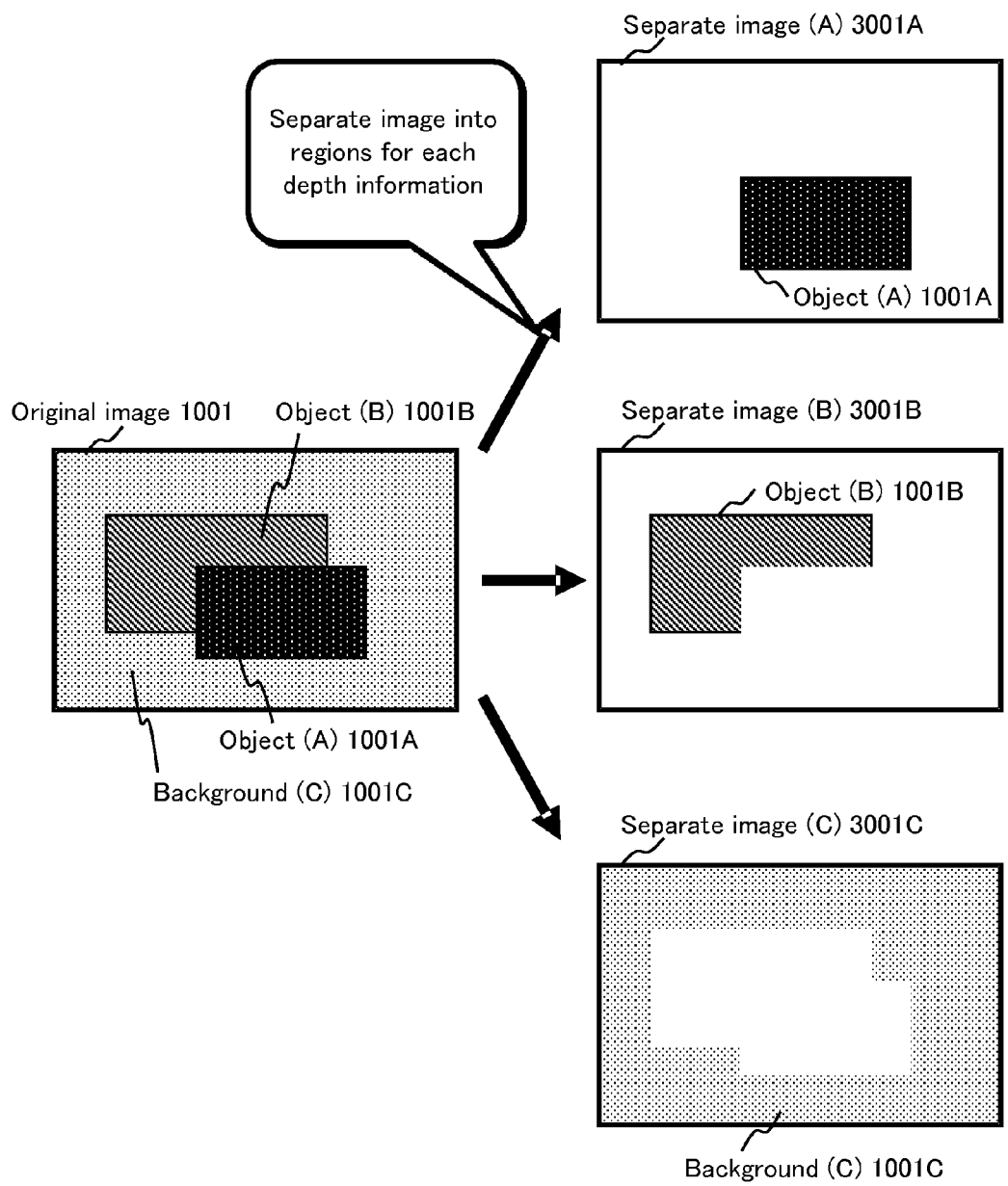
FIG. 3 shows an example of separation processing.

The separation processing unit 1003 separates the original image 1001 for each uniform depth indicated by the depth information of the depth image 1002. For example, the original image 1001 shown in FIG. 3 is separated into a separate image (A) 3001A including a region of an object (A) 1001A, a separate image (B) 3001B including a region of an object (B) 1001B, and a separate image (C) 3001C including a region of an background (C) 1001C.

<Extension Processing>

With respect to a region of an object (region B here) included in each separate image, the extension processing unit 1004 shown in FIG. 1 searches for a boundary where the region B has been in contact with a region of other object (region A here) that is closer to the camera than the object B is before separation of the original image 1001. If finding the boundary, the extension processing unit 1004 performs extension (pixel extension), by duplicating pixels that constitute the region B and are positioned in a neighborhood of the boundary, onto the neighborhood where the region A is positioned before separation. An extended region resulting from the extension is constituted by the pixels that constitute the region B.

Figure 4A:
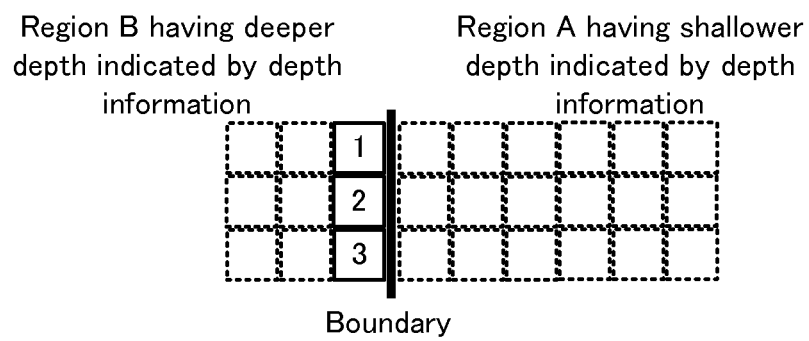
FIG. 4A and FIG. 4B are each a conceptual diagram showing extension processing.
Figure 4B:
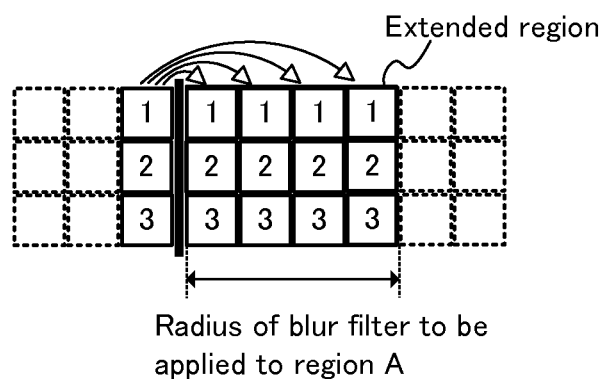

Description is given on the basic concept of extension with reference to FIG. 4A and FIG. 4B. As shown in FIG. 4A, assume that a region B which has a deep depth indicated by the depth information and is more distant from the camera is adjacent, in an original image before separation, to a region A which has a shallow depth indicated by the depth information and is closer to the camera.

In this case, the extension processing unit 1004 generates an extended region, by duplicating a value of each of pixels that constitute the region B and are positioned in a neighborhood of a boundary between the region A and region B in units of a predetermined number of pixels, onto the neighborhood of the boundary outside the region B. Note that the extended region has a width that is equal to the radius of a blur filter which is to be applied to a range included in the region A in subsequent blur processing.

Figure 5:
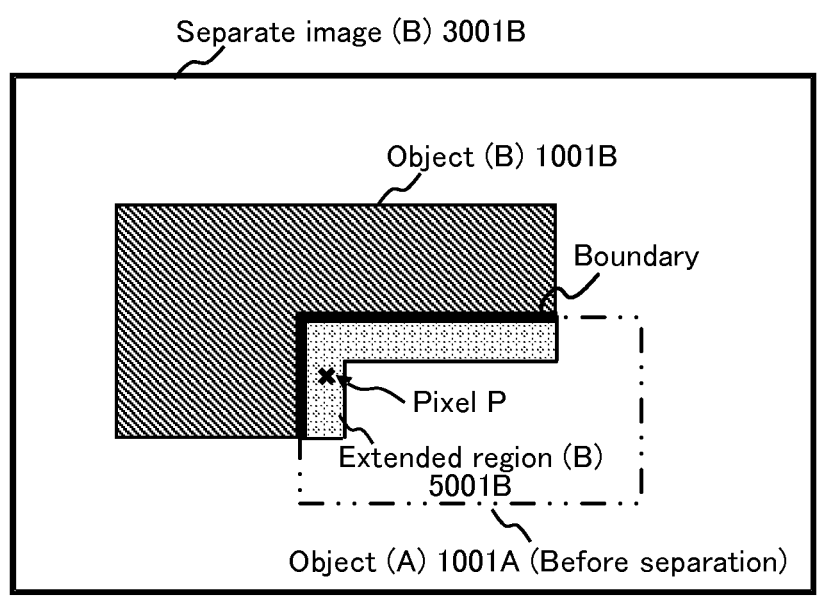
FIG. 5 shows an example of extension processing.

FIG. 5 shows an example of pixel extension performed on the separate image (B) 3001B. For simplification, in FIG. 5, the region of the object (A) 1001A, which is adjacent to the object (B) 1001B before separation and is closer to the camera than the object (B) 1001B is, is expressed by two-dot chain line, and an L-shaped boundary between the region of the object (A) 1001A and the region of the object (B) 1001B is expressed by extra thick line.

Here, it is estimated that the region surrounded by the two-dot chain line includes a shielded region where the object (B) 1001B is shielded by the object (A) 1001A. Although this shielded region would be useful for calculating a hidden surface effect, the shielded region actually does not exist in a captured image. Accordingly, information of the shielded region where the object (B) 1001B is shielded is generated based on the estimation that the object (B) 1001B is shielded by the object (A) 1001A though the shielded region actually does not appear in the captured image. Based on the generated information, pixel extension is performed on pixels that constitute the region of the object (B) 1001B and are positioned in a neighborhood of the boundary between the region of the object (A) 1001A and the region of the object (B) 1001B. As a result, information of pixels that constitute the shielded region is generated.

An extended region (B) 5001B results from the pixel extension. The extended region (B) 5001B has a width that is equal to a radius of a blur filter corresponding to the depth (A) 1002A of the region of the object (A) 1001A that shields the object (B) 1001B.

Note that generation of the extension region (B) 5001B exerts no special influence on the region of the object (A) 1001A. As shown in FIG. 5, the region of the object (A) 1001A included in the separate image (A) 3001A partially overlaps the extended region (B) 5001B. For example, in the separate image (B) 3001B, the pixel P shown in FIG. 5 is positioned in the extended region (B) 5001B. On the other hand, in the separate image (A) 3001A, the pixel P is positioned in the region of object (A) 1001A (see FIG. 6).

<Blur Processing>

Next, with respect to each of the separate images, the blur processing unit 1005 selects a blur filter corresponding to a depth indicated by depth information of the separate image, and performs blur processing on the separate image. Note that a region extended by the extension processing unit 1004 is to be used later for composition with a region including a shielding object, and accordingly the blur processing unit 1005 performs blur processing on the extended region with use of a blur filter corresponding to a depth indicated by depth information of the shielding object.

A general method is utilizable for selecting a blur filter. The blur processing unit 1005 determines a setting value of the blur filter such as the radius of the blur filter, based on depth information and other value such as an aperture value and focal distance of a captured image.

For example, with respect to the region of the object (B) 1001B included in the separate image (B) 3001B, the blur processing unit 1005 selects a blur filter to perform blur processing (first blur processing) based on the depth (B) 1002B of the region of the object (B) 1001B.

Also, with respect to each of the extended region (B) 5001B included in the separate image (B) 3001B and the region of the object (A) 1001A included in the separate image (A) 3001A, the blur processing unit 1005 selects a blur filter to perform blur processing (second blur processing) based on the depth (A) 1002A of the region of the object (A) 1001A.

<Composition Processing>

The composition processing unit 1006 performs processing of compositing all the separate images for output as a blurred image 1007. Especially with respect to composition of an extended region, the composition processing unit 1006 changes a composition ratio for each pixel. This composition ratio is calculated based on an area ratio, in an application range of a blur filter used for blur processing on a composition target pixel, of a first region to a second region in an image before separation.

Figure 6:
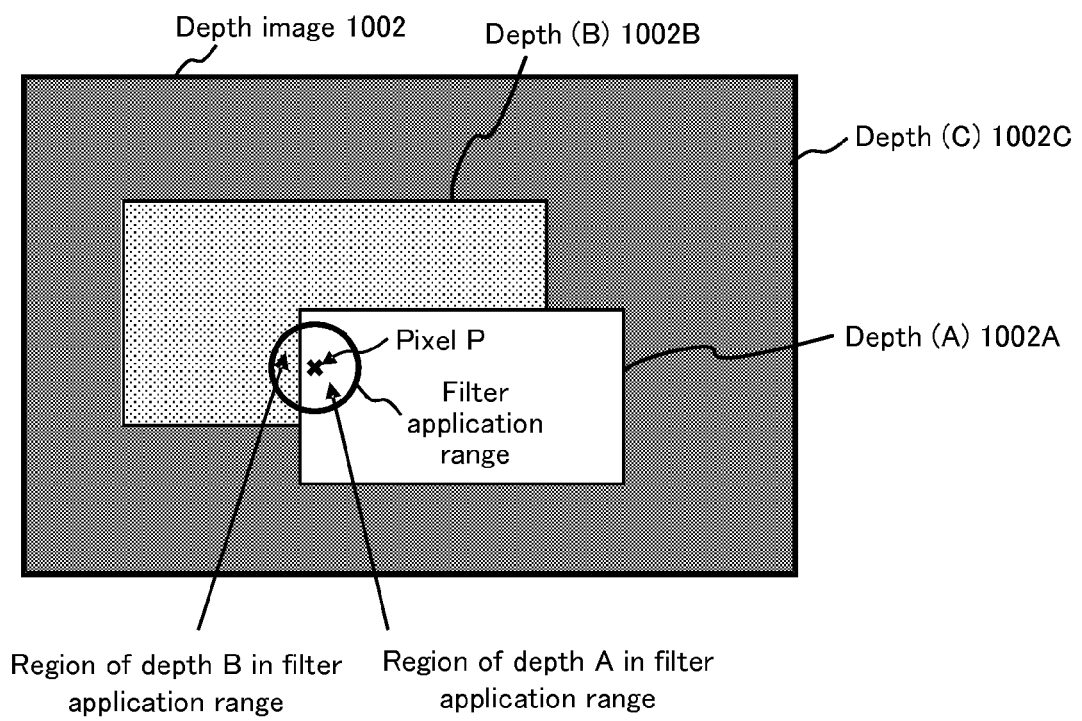
FIG. 6 shows an example of composition processing.

As exemplified in FIG. 6, with respect to composition of the pixel P, an area ratio, in a blur filter application range centering on the pixel P, of the depth (B) 1002B to the depth (A) 1002A in the image before separation, is calculated as a composition ratio of the separate image (B) 3001B to the separate image (A) 3001A on which blur processing has been performed.

For example, in the case where the area ratio of the depth (B) 1002B to the depth (A) 1002A is 20:80, a value of the pixel P is calculated as follows.

Value of pixel $P =$

Value of pixel $P$ on which blur filter has been applied in separate image $(B)$ $3001B$ × $0.2$ + Value of pixel $P$ on which blur filter has been applied in separate image $(A)$ $3001A$ (see FIG. 3) × $0.8$ The larger the distance from the boundary between the objects is, the smaller the area of the depth (B) 1002B in the blur filter application range is. Accordingly, as the distance from the boundary increases, it is possible to increasingly reduce the influence exerted by values of pixels generated as the extended region. This promises a natural hidden surface effect.

According to the present embodiment as described above, it is possible to generate an image of a shielded region that actually does not exist in a captured image, with use of pixels that constitute a region of an object which is estimated to be shielded, thereby generating a blurred image by lens in consideration of a hidden surface effect in an outline part of an object where the depth varies.

Instead of the method shown in FIG. 4, the extension processing unit 1004 may perform pixel extension in extension processing, by copying a pixel pattern near the boundary (see FIG. 13A), folding back the pixel pattern near the boundary (see FIG. 13B), or the like.

Figure 13A:
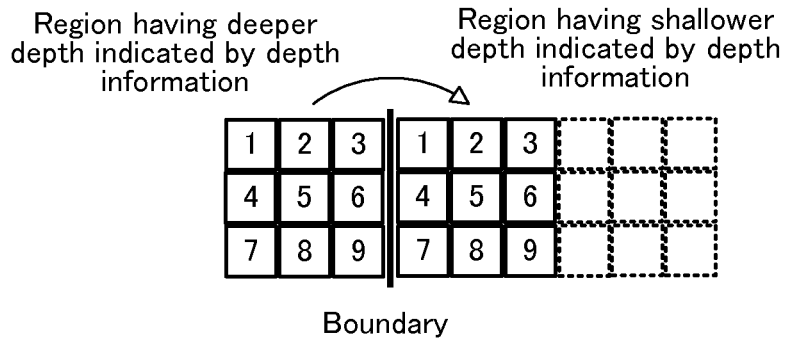
FIG. 13A to FIG. 13C each show another example of extension processing.
Figure 13B:
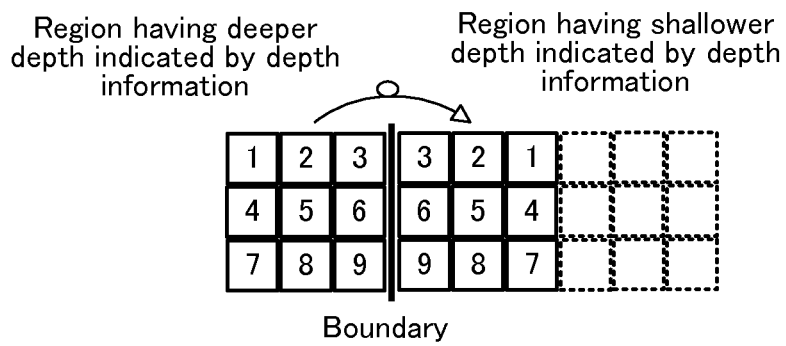
Figure 13C:
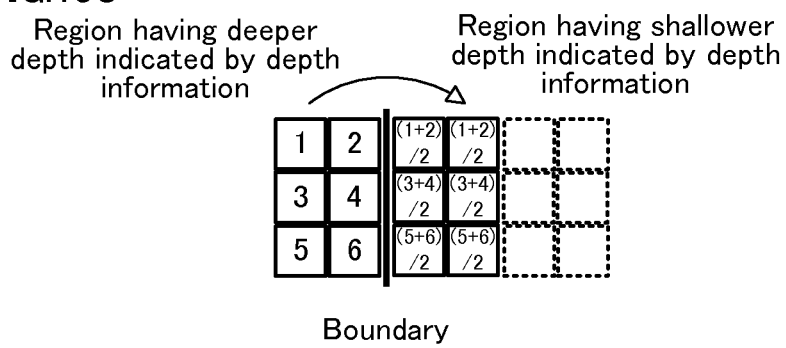

Alternatively, the extension processing unit 1004 may perform pixel extension, by duplicating an average value of a plurality of values of pixels for each pixel in an extended region (see FIG. 13C).

With use of the methods shown in FIG. 13A to FIG. 13C, it is possible to generate an image of an extended region that is more natural.

Also, the blur filter applied here may be in other shape instead of a circle, such as a shape of a rectangle, a hexagon, an octagon, and a pentagram.

Figure 7:
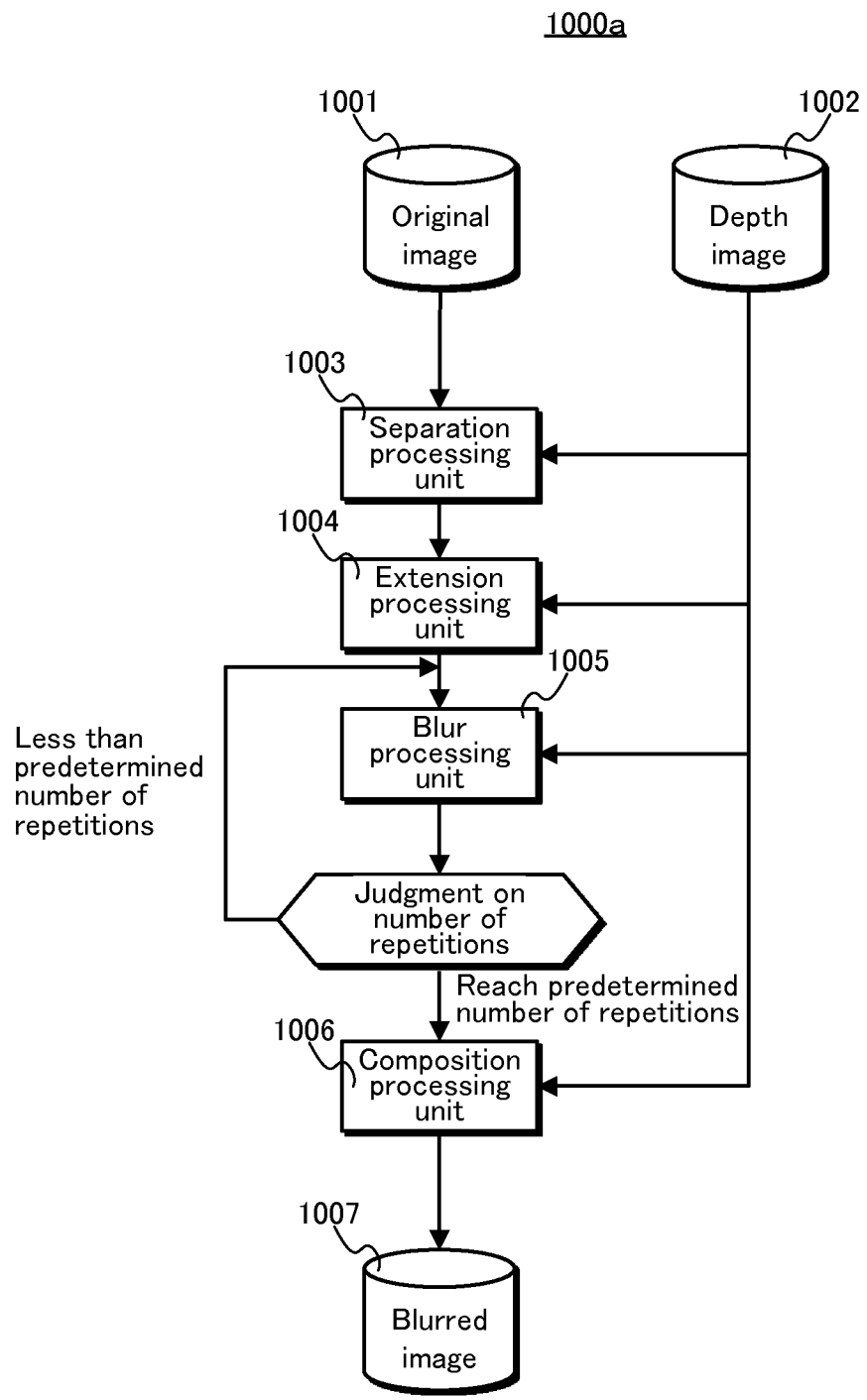
FIG. 7 shows an image processing apparatus relating to a modification example of Embodiment 1.

Also, with the structure of an image processing apparatus 1000a shown in FIG. 7, blur processing may be repeatedly performed on a result of blur processing at least one time. Assume, for example, a case where the upper limit size of a blur filter to be applied for blur processing is set to low for reduction in implementation cost. In this case, while the setting value of the blur filter is determined based on depth information and so on as described above, restrictions are put on the upper limit size of the blur filter.

Blur processing can be performed only under the restrictions on the upper limit size of the blur filter. However, by repeatedly applying the filter in this way, it is possible to increase a range and a degree of a blur effect as the number of repetitions of applying the filter. Also, it is of course possible to reduce implementation cost.

Figure 8:
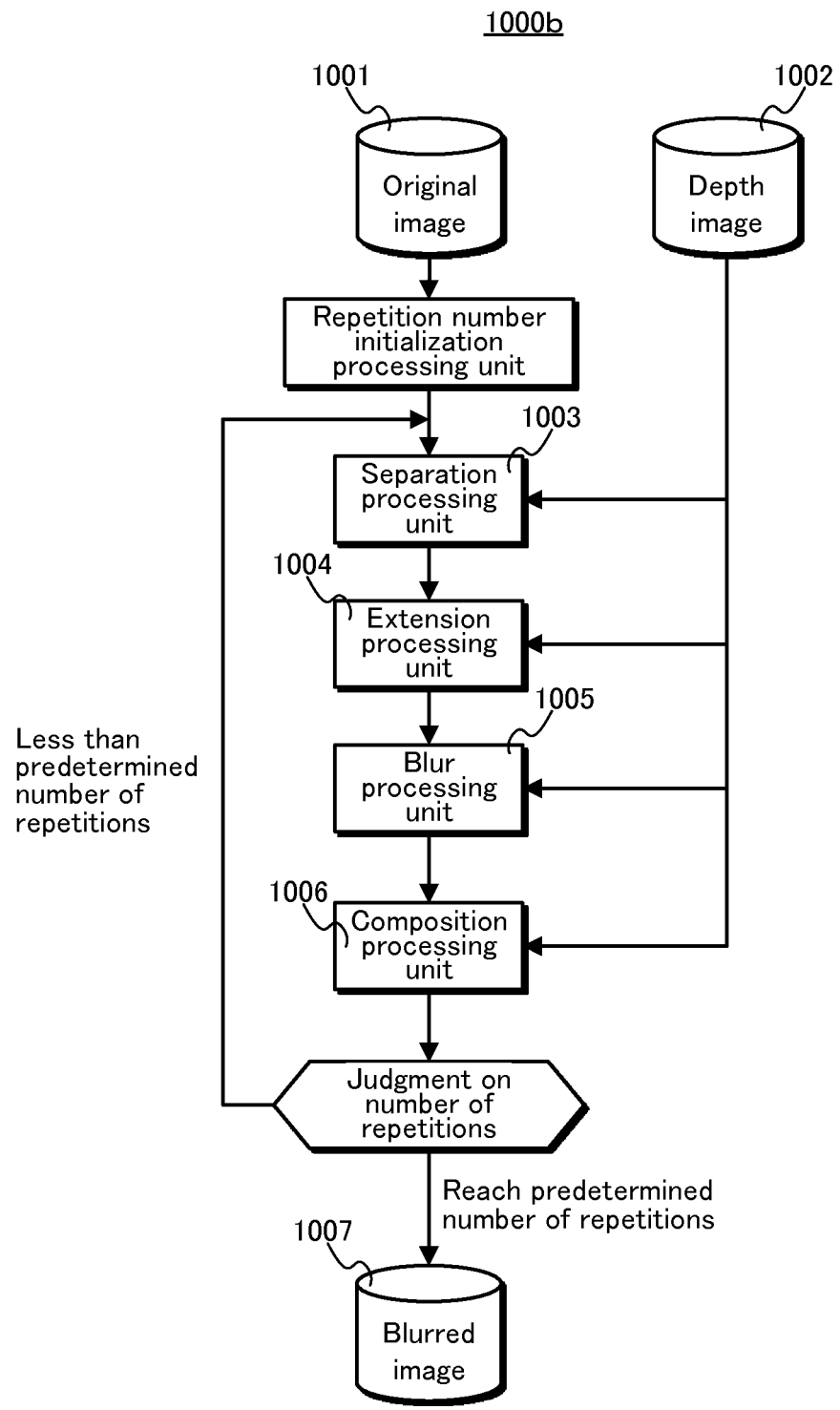
FIG. 8 shows an image processing apparatus relating to a modification example of Embodiment 1.

Furthermore, with the structure of an image processing apparatus 1000b shown in FIG. 8, blur processing may be repeatedly performed on a result of blur processing at least one time. In the flow shown in FIG. 8, until the number of repetitions of the blur processing reaches a predetermined number, the separation processing unit 1003 again separates an image which has been previously composited by the composition processing unit 1006.

Assume, for example, a case where the upper limit size of a blur filter to be applied for blur processing is set to low for reduction in implementation cost. Blur processing can be performed only under the restrictions on the upper limit size of the blur filter. However, by repeatedly applying the filter in this way, it is possible to increase a range and a degree of a blur effect as the number of repetitions of applying the filter. Also, it is of course possible to reduce implementation cost.

(Embodiment 2)

Figure 9:
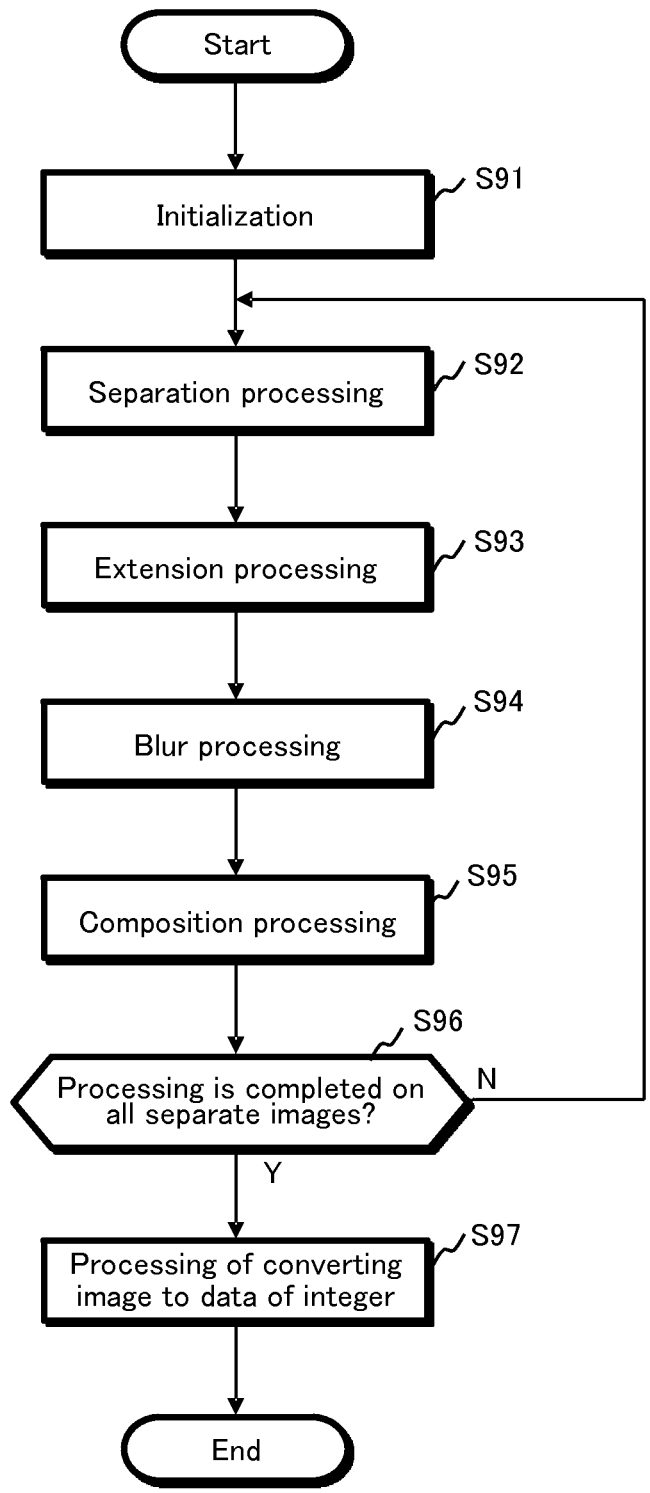
FIG. 9 is a flow chart of the entire processing performed by an image processing apparatus relating to Embodiment 2.

FIG. 9 is a flow chart of the entire processing performed by an image processing program relating to Embodiment 2.

The image processing program is a program for causing a computer to perform blur effect processing including separation processing, extension processing, blur processing, and composition processing. As the entire processes, only each image having a uniform depth in the depth image 1002 is extracted as a separate image from the original image 1001, and separation processing in S92, extension processing in S93, blur processing in S94, and composition processing in S95 are repeatedly performed on the separate image.

Note that an image resulting from composition processing is data containing a decimal number, and accordingly is converted to data containing an integer after processing is completed on all the separate images. As a result, a blurred image 1007 is finally generated.

The following describes in detail each processing shown in FIG. 9.

Initialization in S91 is processing including initialization of a depth number N of a separate image on which processing is to be performed in the loop to N=0, creation of a composition ratio mapping table, and initialization of an extended region.

The composition ratio mapping table is a table that shows, for each pixel, the correspondence between a depth number of an image and a composition ratio. The composition ratio mapping table stores therein information indicating, with respect to each depth number, a composition ratio of an image having the depth number in an application range of a blur filter corresponding to a depth of the image indicated in the depth image 1002.

In separation processing in S92, an image having a depth number N in the depth image 1002 is acquired from the original image 1001 to generate a separate image. Note that in the case where the depth image 1002 includes no image having the depth number N, the depth number N is incremented, and a next image having the incremented depth number N is acquired.

Figure 10:
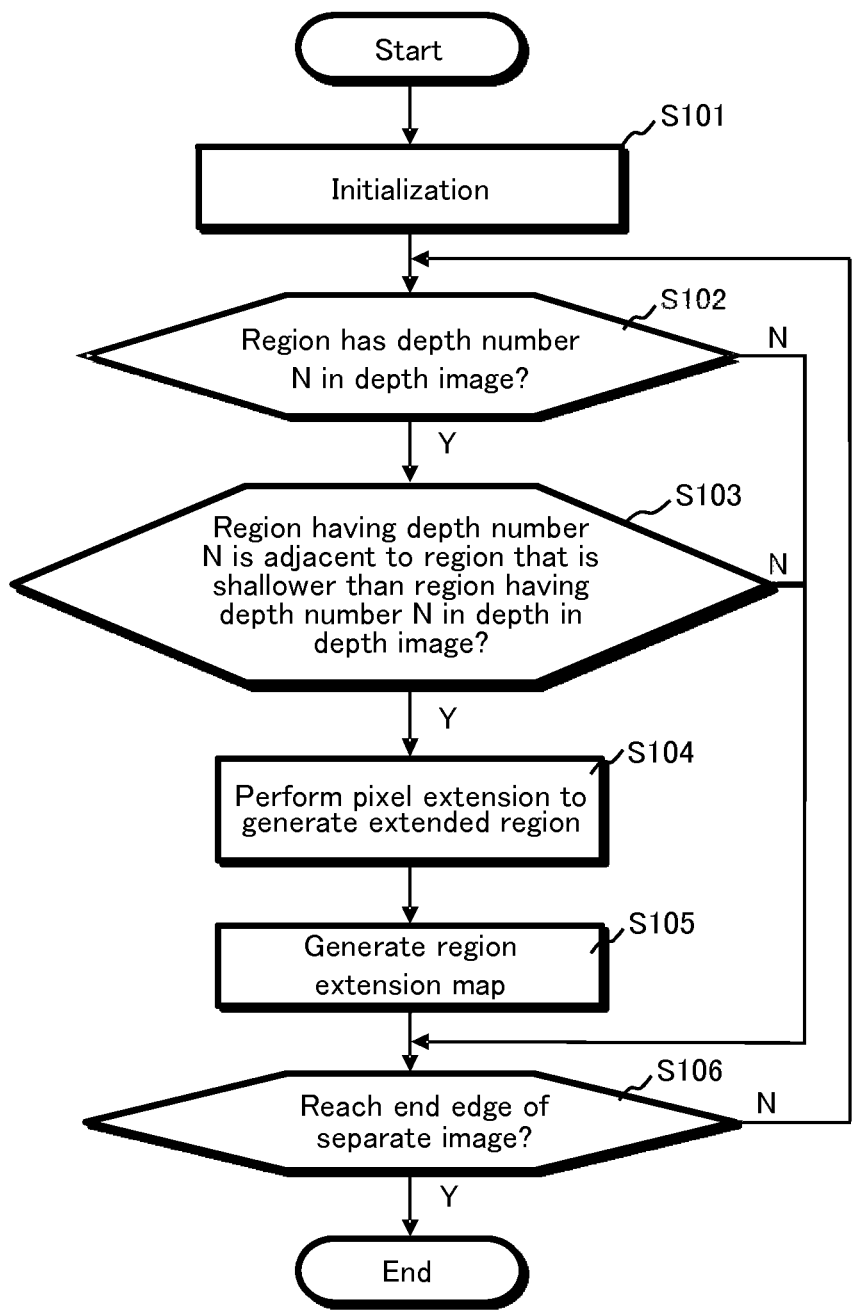
FIG. 10 is a flow chart of extension processing.

Extension processing in S93 shown in FIG. 9 is described with reference to FIG. 10.

A position of a pixel that is a processing target and the region extension map are initialized (S101), and then a loop is started for generating an extended region.

In the loop, the following processing is performed until searching is completed until the end edge of a separate image is reached (S106).

A separate image having the depth number N is detected (S102). If the separate image having the depth number N is judged to be adjacent to a separate image that is shallower in depth than the separate image having the depth number N (S103: Y), pixel extension is performed on the separate image that is shallower in depth (S104). Then, with respect to a region resulting from the pixel extension, a value 1 is set to the region extension map (S105).

Figure 11:
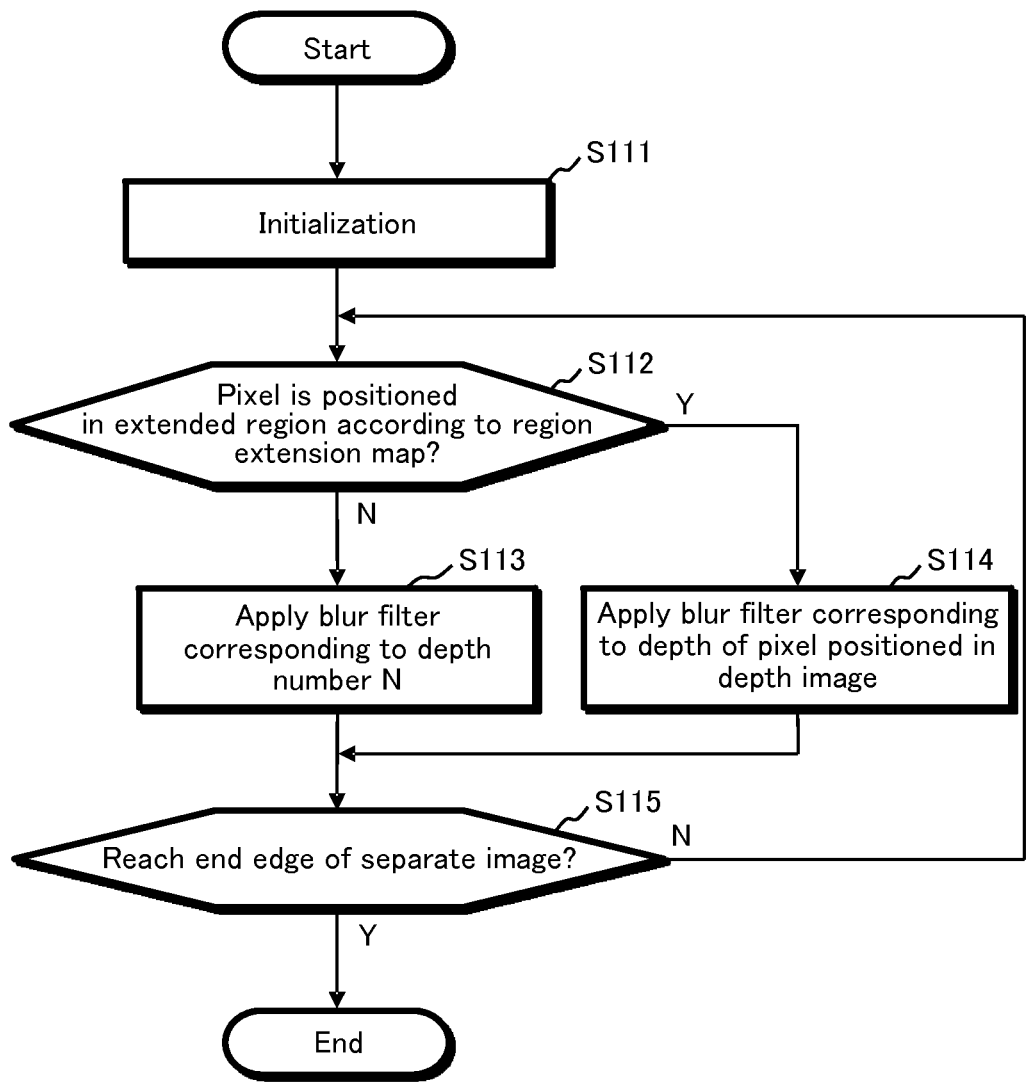
FIG. 11 is a flow chart of blur processing.

Blur processing in S94 shown in FIG. 9 is described with reference to FIG. 11.

A position of a pixel that is a processing target is initialized (S111), and then a loop for blur processing is started.

In the loop, the following processing is performed with reference to the region extension map generated in the extension processing S93. If a pixel that is a processing target is positioned in an extended region (S112: Y), a blur filter is applied which corresponds to a depth of the pixel in the depth image (S 114). If the pixel is not positioned in the extended region (S112: N), a blur filter is applied which corresponds to a depth indicated by the depth number N (S113). Steps S112 to S114 are repeatedly performed until the end edge of the separate image is reached (S115).

Composition processing in S95 shown in FIG. 9 is described with reference to FIG. 12.

In the loop of Steps S122 and S123, in accordance with the composition ratio mapping table, a value of a pixel constituting the separate image having the depth number N and a value of a pixel constituting the extended region that correspond in position with each other are composited with each other (S122).

A blurred image having each depth is cumulatively added to the extended region by a composition ratio until the processing is completed on all the separate images.

Here, in order to avoid a decimal error due to cumulative addition, the blurred image having each depth is cumulated as data containing a decimal number in the extended region until the processing is completed on all the separate images (S96: Y). Finally, the blurred image 1007 is generated after processing of converting to data containing an integer in S97 shown in FIG. 9.

With this structure, the extension processing in S93 enables to generate an image of a shielded region where an object is shielded that actually does not exist in a captured image, by extending the image of the shielded region using pixels constituting a region of the shielded object. Also, the blur processing in S94 and the composition processing in S95 are performed. Blur processing and composition processing even on a shielded region enables to generate a blurred image by lens in consideration of a hidden surface effect in an outline part of an object where the depth varies.

Also, in the case where an image is calculated by separating for each depth information piece all at once on the assumption that the number of values that represent the depth is 256 for example, an intermediate buffer for each depth needs the screen size for one screen of 256 screens+1 screen for work. According to this method, an intermediate buffer can perform processing by the screen size of 1 screen+1 screen for work, thereby greatly reducing the memory. Furthermore, according to this method, although a composition ratio mapping table is generated for each pixel, the number of necessary pixels that are composition targets does not always correspond to the number of values that represent the depth (256 pixels in the above example). Accordingly, by preparing only a necessary composition ratio mapping table that corresponds to the depth number N and the composition ratio, it is possible to greatly reduce the total memory amount.

(Embodiment 3)

Figure 14:
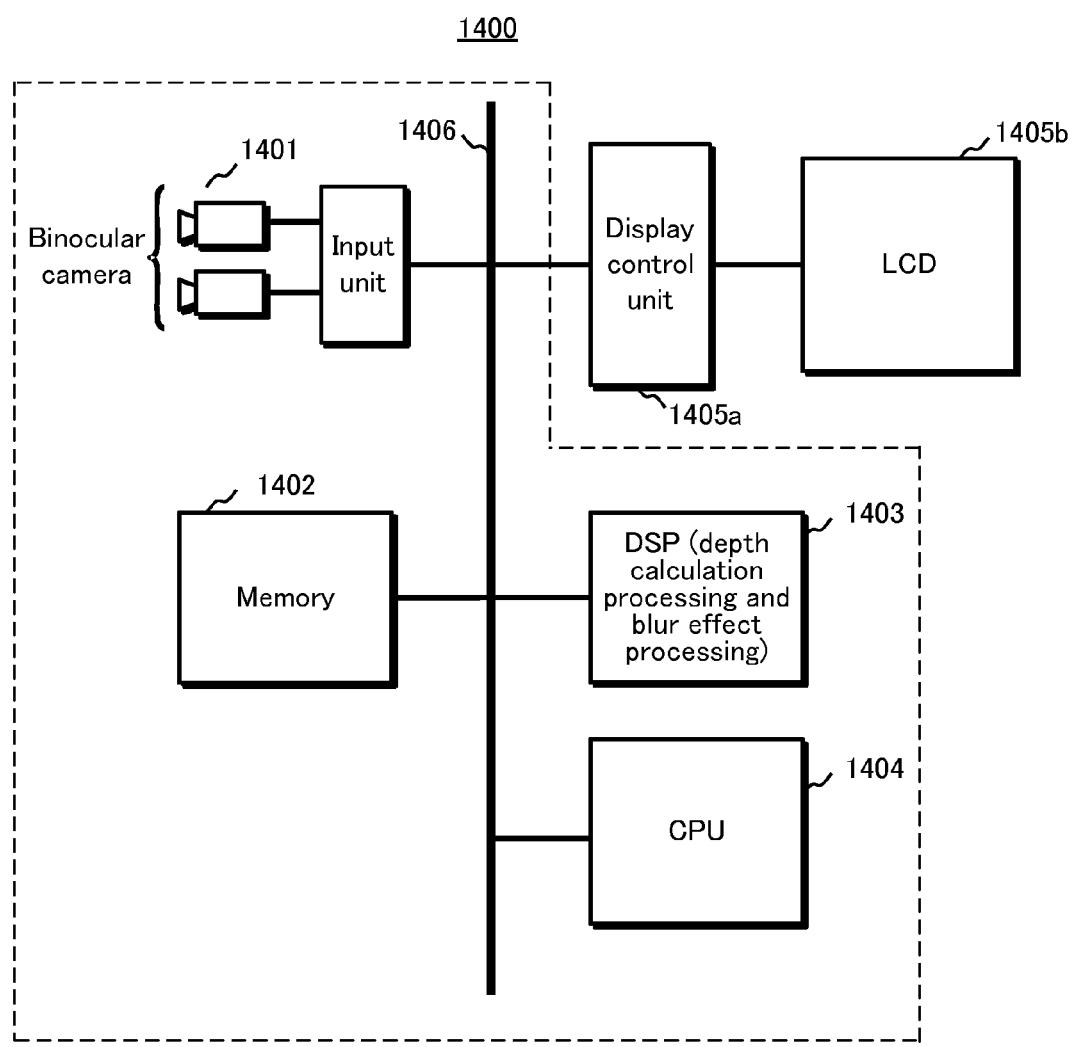
FIG. 14 shows an imaging apparatus including a binocular camera.

FIG. 14 shows an imaging apparatus 1400 relating to Embodiment 3.

A CPU 1404 controls the entire system by a program, and controls a binocular camera 1401 connected to a bus 1406 and a DSP (Digital Signal Processor) (depth calculation processing and blur effect processing) 1403, and also controls an LCD (Liquid Crystal Display) 1405b via a display control unit 1405a.

The binocular camera 1401 is a camera that is mounted on a portable apparatus, and is capable of capturing left and right images by focusing on the entire image with a small-diameter lens, and transfers the captured left and right images to a memory for storage.

In depth calculation processing performed by the DSP (depth calculation processing and blur effect processing) 1403, with respect to the captured left and right images stored in the memory as an input, disparity between the left and right images is detected to generate a depth image for storage in the memory.

Also, in blur effect processing performed by the DSP (depth calculation processing and blur effect processing) 1403, with respect to the captured left image (or right image) and the depth image as an input, a blurred image is generated with use of the method described in Embodiment 1 or 2 and is stored in the memory 1402.

The CPU 1404 reads the blurred image stored in the memory 1402, and controls the LCD 1405b to display the blurred image via the control unit 1405a.

With this structure, it is possible to generate an image by adding a blur effect to a captured image in consideration of a hidden surface effect, and display the generated image on an LCD. Therefore, it is possible to display, on the LCD, an image captured by a camera with a small-diameter lens as if the image were captured by a camera with a large-diameter lens. That is, it is possible to display, on the LCD, an image having added thereto a blur effect where a particular subject is focused on and other subject is blurred to emphasize the particular subject.

Also, especially binocular cameras often have a difficulty in increasing the lens size in view of restrictions on the space for housing a lens in a housing and weight reduction. Therefore, it is useful to apply the blur effect processing relating to the present embodiment.

(Embodiment 4)

Figure 15:
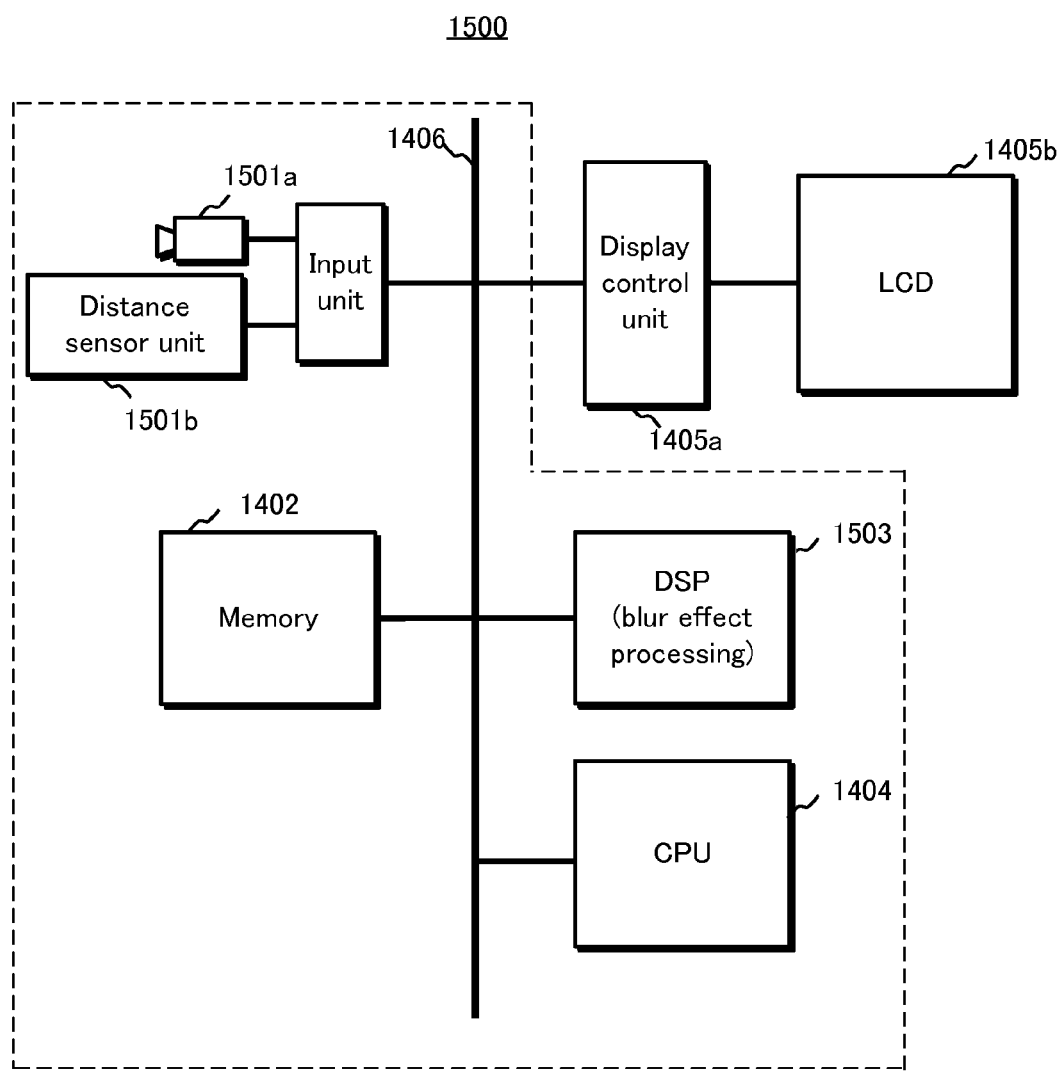
FIG. 15 shows an imaging apparatus including a monocular camera and a distance sensor unit.

FIG. 15 shows an imaging apparatus 1500 relating to Embodiment 4. The same components shown in FIG. 15 as those shown in FIG. 14 have the same numerical references as those in FIG. 14.

A CPU 1404 controls the entire system by a program, and controls a monocular camera 1501a connected to a bus 1406, a distance sensor unit 1501b, and a DSP (blur effect processing) 1503, and also controls an LCD 1405b via a display control unit 1405a.

The monocular camera 1501a is a camera that is mounted on a small portable apparatus, and is capable of capturing an image by focusing on the entire image with a small-diameter lens, and transfers the captured image to a memory 1402 for storage.

The distance sensor unit 1501b measures a distance to a subject by infrared rays or the like, and transfers the measured distance as a depth image to a memory for storage.

Also, in blur processing performed by the DSP (blur effect processing) 1503, with respect to the captured image and the depth image as an input, a blurred image is generated with use of the method described in Embodiment 1 or 2 and is stored in the memory 1402.

The CPU 1404 reads the blurred image stored in the memory 1402, and controls the LCD 1405b to display the blurred image via the control unit 1405a.

With this structure, it is possible to generate an image by adding a blur effect on a captured image in consideration of a hidden surface effect, and display the generated image on an LCD. Therefore, it is possible to display, on the LCD, an image captured by a camera with a small-diameter lens as if the image were captured by a camera with a large-diameter lens. That is, it is possible to display, on the LCD, an image having added thereto a blur effect where a particular subject is focused on and other subject is blurred to emphasize the particular subject.

Note that the imaging apparatus 1500 does not necessarily need to include a display such as an LCD. Alternatively, the imaging apparatus 1500 may not include the display control unit 1405*a* and the LCD 1405*b*. In other words, the imaging apparatus 1500 may be an imaging apparatus constituted from components surrounded by dashed line in FIG. 15. The same applies to the imaging apparatus 1400.

(Embodiment 5)

Figure 16:
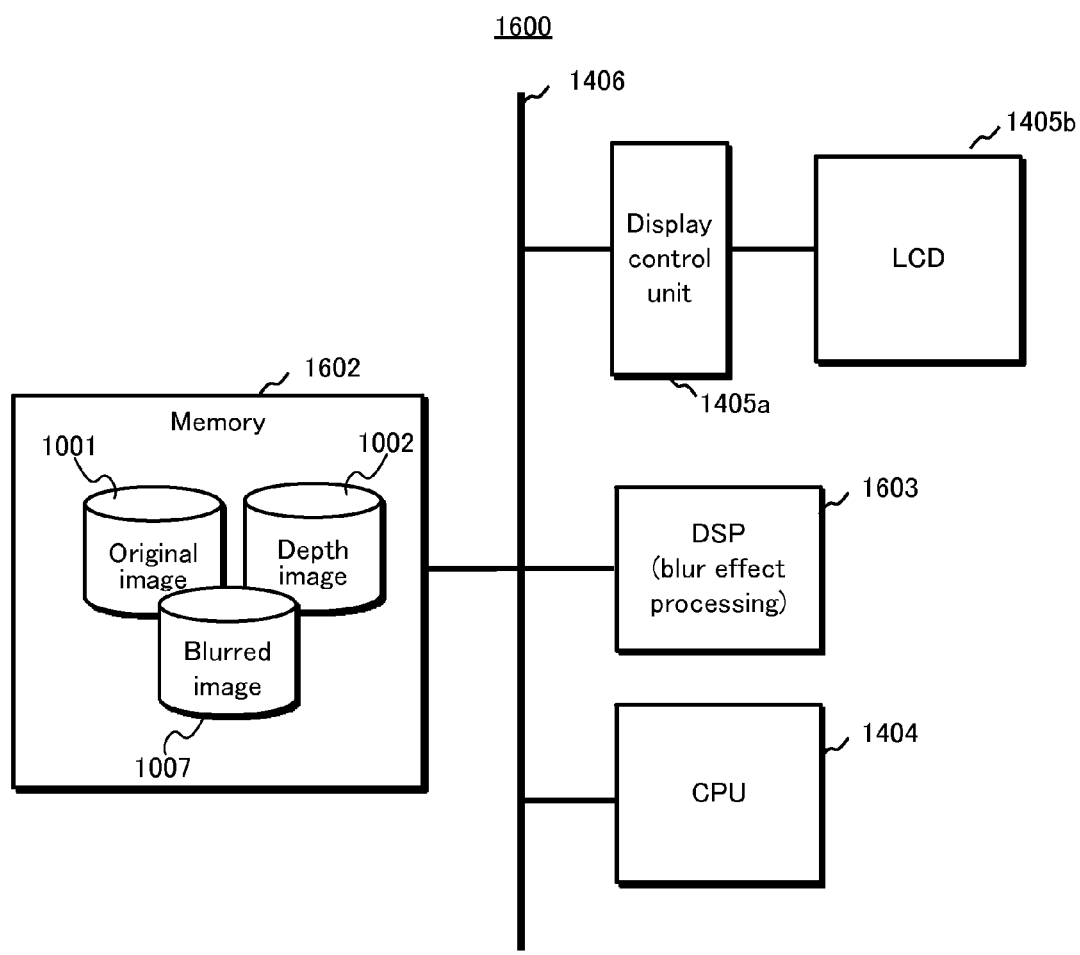
FIG. 16 shows a display apparatus.
Figure 17:
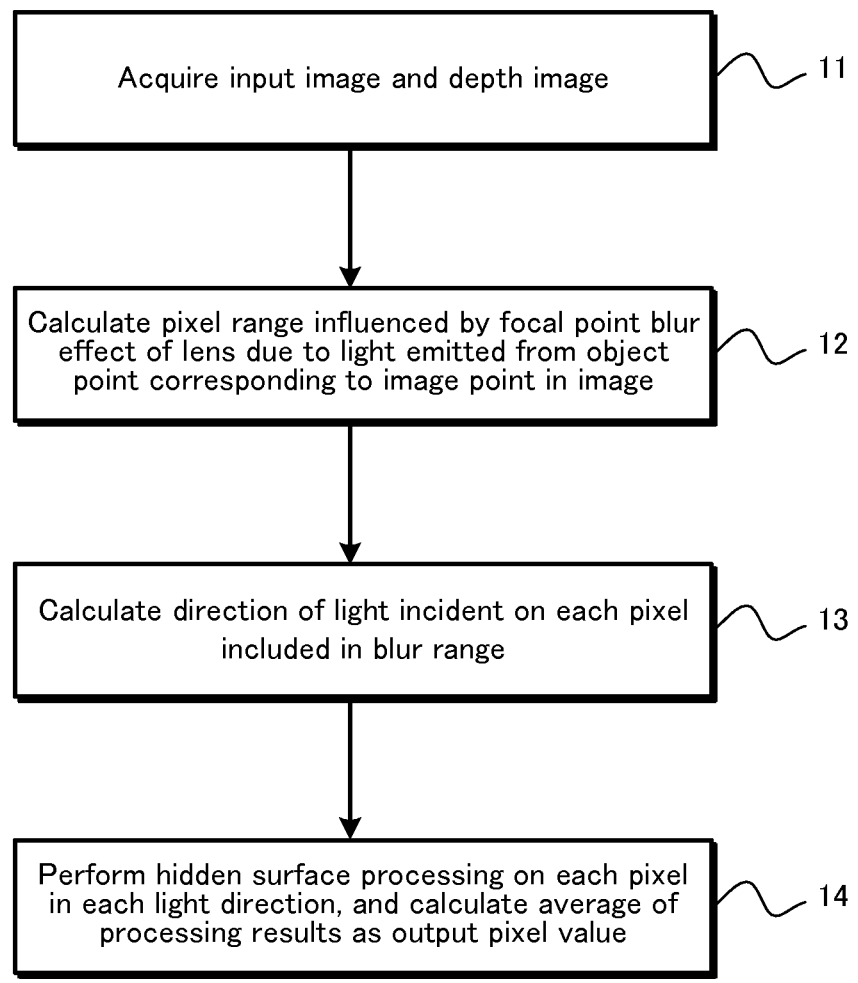
FIG. 17 explains a conventional principle.
Figure 18:
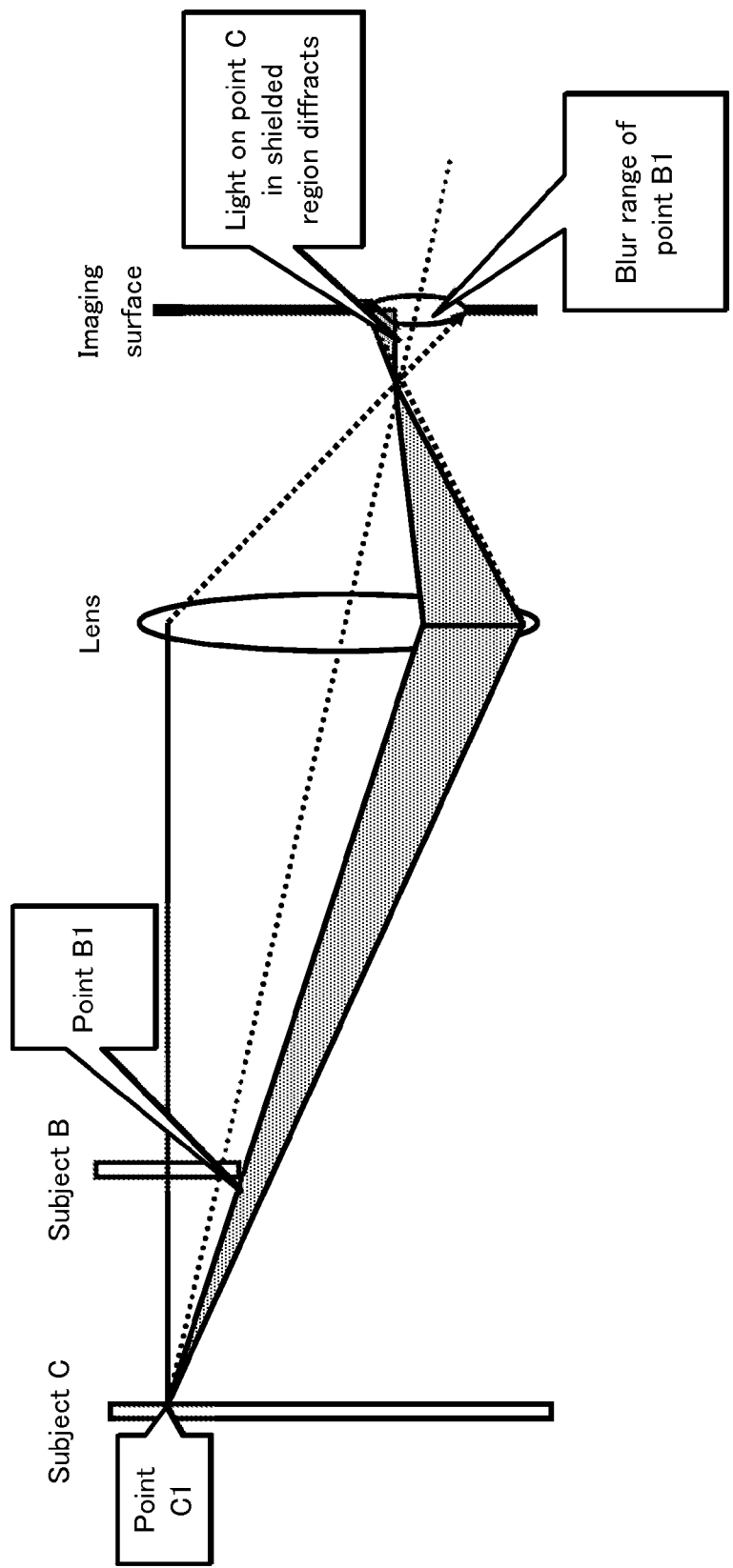
FIG. 18 explains a hidden surface effect.

FIG. 16 shows a display apparatus 1600 relating to Embodiment 5. The same components shown in FIG. 16 as those shown in FIG. 14 have the same numerical references as those in FIG. 14.

A memory 1602 stores therein an original image 1001 and a depth image 1002 that have been acquired from an external apparatus.

Also, in blur effect processing performed by the DSP (blur effect processing) 1603, with respect to the original image 1001 and the depth image 1002 as an input, a blurred image 1007 is generated with use of the method described in Embodiment 1 or 2 and is stored in the memory 1602.

<Supplement 1>

Although the above embodiments have been described, the present invention is not limited to the contents described above. The present invention also can be implemented in various forms for achieving the aim of the present invention and an aim related to or associated with the aim of the present invention. For example, the present invention may be implemented as follows.

(1) Application to Computer Graphics

The methods described in the above embodiments enable to exhibit an appropriate blur effect without using information of a shielded region, and are accordingly preferable to be applied to a captured image. Also, the methods are applicable to an image generated by computer graphics. Especially compared with the method such as disclosed in Patent Literature 1, it is unnecessary to calculate a direction of light incident on each pixel, thereby reducing the processing load.

(2) Recording Medium

The program described in Embodiment 2 and so on can be recorded on a recording medium or distributed via various types of communication paths.

Such a recording medium is a non-transitory recording medium such as an IC card, a hard disk, an optical disc, a flexible disc, and a ROM.

The distributed program is stored in a memory or the like readable by a processor for use. The various functions such as described in the above embodiments are realized by the processor executing the program.

(3) Integrated Circuit

The respective image processing apparatuses relating to the above embodiments may be typically implemented as an LSI (Large Scale Integration) that is an integrated circuit. Each circuit may be separately integrated into a single chip, or integrated into a single chip including part or all of the circuits. For example, the LSI may be integrated into the same integrated circuit into which other circuits are integrated, or may be integrated into other integrated circuit.

The above description has been made on the basis of an LSI. Alternatively, the name of the integrated circuit may differ according to the degree of integration of the chips. Other integrated circuits include an IC (integrated circuit), a system LSI, a super LSI, and an ultra LSI.

Furthermore, the method applied for forming integrated circuits is not limited to the LSI, and the present invention may be implemented on a dedicated circuit or a general purpose processor. For example, the present invention may be implemented on an FPGA (Field Programmable Gate Array) programmable after manufacturing LSIs, or a reconfigurable processor in which connection and settings of a circuit cell inside each LSI are reconfigurable after manufacturing LSIs.

Furthermore, when new technology for forming integrated circuits that replaces LSIs becomes available as a result of progress in semiconductor technology or semiconductor-derived technologies, functional blocks may be integrated using such technology. One possibility lies in adaptation of biotechnology.

(4) Display

Although FIG. 14 to FIG. 16 each show an example of an LCD as a display, a display driven by other driving method may be used such as an organic EL display.

<Supplement 2>

The above embodiments include the following aspects.

(1) An image processing apparatus relating to the embodiments comprises: a separation unit configured to separate a captured image into a plurality of regions including a first region and a second region that is shallower than the first region in terms of depth indicated by depth information of the captured image; an extension unit configured to duplicate pixels that constitute the first region and are positioned in a neighborhood of a boundary between the first region and the second region, onto the neighborhood of the boundary outside the first region, thereby generating an extended region; a blur processing unit configured to perform blur processing on the extended region and the second region based on the depth of the second region indicated by the depth information; and a composition unit configured to, after the blur processing, composite a value of each of pixels constituting the extended region and a value of one of pixels constituting the second region that correspond in position with each other.

(2) The composition unit may set a composition ratio of a value of each of the pixels constituting the extended region to a value of a corresponding one of the pixels constituting the second region, such that the composition ratio is increasingly lower as the pixel constituting the extended region is more distant from the first region.

(3) The composition unit may perform the composition at a composition ratio that is calculated based on an area ratio, in a range where a blur filter has been applied to each target pixel in the blur processing, of the first region to the second region in the captured image.

(4) The separation unit, the extension unit, the blur processing unit, and the composition unit may repeatedly perform the separation processing, the extension processing, the blur processing, and the composition processing, respectively, thereby adjusting a blur effect.

(5) The blur processing unit may repeatedly perform the blur processing, thereby adjusting a blur effect.

(6) With respect to one target region among the regions, the extension unit may judge whether the target region is adjacent to other of the regions that is shallower than the target region in terms of depth indicated by the depth information, and when judging that the target region is adjacent to the other region, the extension unit may duplicate pixels that constitute the target region and are positioned in a neighborhood of a boundary between the target region and the adjacent region, onto the neighborhood of the boundary outside the target region, thereby generating an extended region.

(7) An integrated circuit relating to the embodiments comprises: a separation unit configured to separate a captured image into a plurality of regions including a first region and a second region that is shallower than the first region in terms of depth indicated by depth information of the captured image; an extension unit configured to duplicate pixels that constitute the first region and are positioned in a neighborhood of a boundary between the first region and the second region, onto the neighborhood of the boundary outside the first region, thereby generating an extended region; a blur processing unit configured to perform blur processing on the extended region and the second region based on the depth of the second region indicated by the depth information; and a composition unit configured to, after the blur processing, composite a value of each of pixels constituting the extended region and a value of one of pixels constituting the second region that correspond in position with each other.

(8) A program relating to the embodiments causes a computer to perform blur effect processing, the blur effect processing comprises: a separation step of separating a captured image into a plurality of regions including a first region and a second region that is shallower than the first region in terms of depth indicated by depth information of the captured image; an extension step of duplicating pixels that constitute the first region and are positioned in a neighborhood of a boundary between the first region and the second region, onto the neighborhood of the boundary outside the first region, thereby generating an extended region; a blur processing step of performing blur processing on the extended region and the second region based on the depth of the second region indicated by the depth information; and a composition step of, after the blur processing, compositing a value of each of pixels constituting the extended region and a value of one of pixels constituting the second region that correspond in position with each other.

(9) An imaging apparatus relating to the embodiments comprises: an imaging unit having a stereo camera; a display unit; a memory configured to store therein the program of Item (8) and a left image and a right image captured by the stereo camera; a DSP configured to perform generation processing of generating a depth image indicating depth information for each pixel based on the captured left and right images stored in the memory, and perform the blur effect processing of Item (8) on at least one of the captured left and right images; and a CPU configured to control processing of storing the left image and the right image captured by the stereo camera in the memory, control processing of causing the DSP to perform the generation processing and the blur effect processing, and control processing of causing the display unit to display a result of the blur effect processing.

(10) An imaging apparatus relating to the embodiments comprises: an imaging unit having a monocular camera; a display unit; a distance sensor unit configured to measure, for each pixel, a distance to a subject captured by the imaging unit; a memory configured to store therein the program of Item (8), an image captured by the monocular camera, and the distance measured for each pixel by the distance sensor unit; a DSP configured to perform generation processing of generating a depth image indicating depth information for each pixel based on the captured image stored in the memory and the measured distance for each pixel, and perform the blur effect processing of Item (8) on the captured image; and a CPU configured to control processing of storing the left image and the right image captured by the monocular camera in the memory, control processing of causing the DSP to perform the generation processing and the blur effect processing, and control processing of causing the display unit to display a result of the blur effect processing.

(11) A display apparatus relating to the embodiments comprises: a display unit; a memory configured to store therein the program of Item (8), a captured image, and a depth image indicating depth information for each pixel of the captured image; a DSP configured to perform the blur effect processing of Item (8) on the captured image; and a CPU configured to control processing of causing the DSP to perform the blur effect processing, and control processing of causing the display unit to display a result of the blur effect processing.

(12) An image processing apparatus relating to the embodiments comprises: a blur processing unit configured to, based on a captured image and a depth image indicating depth information of the captured image, perform blur processing on the captured image, thereby generating a blurred image; and a repetition unit configured to, based on the generated blurred image and the depth information, repeatedly perform the blur processing on the generated blurred image to generate a new blurred image until a number of repetitions of the blur processing reaches a predetermined number.

(13) A program that causes a computer to perform blur effect processing, the blur effect processing comprises: a blur processing step of, based on a captured image and a depth image indicating depth information of the captured image, performing blur processing on the captured image, thereby generating a blurred image; and a repetition step of, based on the generated blurred image and the depth information, repeatedly performing the blur processing on the generated blurred image to generate a new blurred image until a number of repetitions of the blur processing reaches a predetermined number.

INDUSTRIAL APPLICABILITY

The image processing apparatus relating to the present invention has a function of performing processing of adding a blur by a lens to a captured image in consideration of a hidden surface effect, and accordingly is utilizable for a digital camera, a mobile phone, and so on that are capable of capturing images and generating depth images. Also, the image processing apparatus relating to the present invention is capable of generating a depth image from a stereo image, and accordingly is applicable to the use of a TV, a recorder, and so on that target stereo images.

REFERENCE SIGNS LIST 1001 original image
1002 depth image
1003 separation processing unit
1004 extension processing unit
1005 blur processing unit
1006 composition processing unit
1007 blurred image
1001A object (A)
1001B object (B)
1000C background (C)
1002A depth (A)
1002B depth (B)
1002C depth (C)
3001A separate image (A)
3001B separate image (B)
3001C separate image (C)
5001B extended region (B)
1400 imaging apparatus 1401 binocular (stereo) camera
1402 memory
1403 DSP (depth conversion processing and blur processing)
1404 CPU
1405a display control unit
1405b LCD
1406 bus
1500 imaging apparatus
1501a monocular camera
1501b distance sensor unit
1503 DSP (blur effect processing)
1600 display apparatus
1602 memory
1603 DSP (blur effect processing)

The invention claimed is:

1. An image processing apparatus comprising:
a separation unit configured to separate a captured image into a plurality of regions including a first region and a second region that is shallower than the first region in terms of depth indicated by depth information of the captured image;
an extension unit configured to duplicate pixels that constitute the first region and are positioned in a neighborhood of a boundary between the first region and the second region, onto the neighborhood of the boundary outside the first region, thereby generating an extended region;
a blur processing unit configured to perform blur processing on the extended region and the second region based on the depth of the second region indicated by the depth information; and
a composition unit configured to, after the blur processing, composite a value of each of pixels constituting the extended region and a value of one of pixels constituting the second region that correspond in position with each other.

2. The image processing apparatus of claim 1, wherein the composition unit sets a composition ratio of a value of each of the pixels constituting the extended region to a value of a corresponding one of the pixels constituting the second region, such that the composition ratio is increasingly lower as the pixel constituting the extended region is more distant from the first region.

3. The image processing apparatus of claim 1, wherein the composition unit performs the composition at a composition ratio that is calculated based on an area ratio, in a range where a blur filter has been applied to each target pixel in the blur processing, of the first region to the second region in the captured image.

4. The image processing apparatus of claim 1, wherein the separation unit, the extension unit, the blur processing unit, and the composition unit repeatedly perform the separation processing, the extension processing, the blur processing, and the composition processing, respectively, thereby adjusting a blur effect.

5. The image processing apparatus of claim 1, wherein the blur processing unit repeatedly performs the blur processing, thereby adjusting a blur effect.

6. The image processing apparatus of claim 1, wherein with respect to one target region among the regions,
the extension unit judges whether the target region is adjacent to other of the regions that is shallower than the target region in terms of depth indicated by the depth information, and
when judging that the target region is adjacent to the other region,
the extension unit duplicates pixels that constitute the target region and are positioned in a neighborhood of a boundary between the target region and the adjacent region, onto the neighborhood of the boundary outside the target region, thereby generating an extended region.

7. An integrated circuit comprising:
a separation unit configured to separate a captured image into a plurality of regions including a first region and a second region that is shallower than the first region in terms of depth indicated by depth information of the captured image;
an extension unit configured to duplicate pixels that constitute the first region and are positioned in a neighborhood of a boundary between the first region and the second region, onto the neighborhood of the boundary outside the first region, thereby generating an extended region;
a blur processing unit configured to perform blur processing on the extended region and the second region based on the depth of the second region indicated by the depth information; and
a composition unit configured to, after the blur processing, composite a value of each of pixels constituting the extended region and a value of one of pixels constituting the second region that correspond in position with each other.

8. A non-transitory computer readable recording medium having recorded therein a program that causes a computer to perform blur effect processing, the blur effect processing comprising:
a separation step of separating a captured image into a plurality of regions including a first region and a second region that is shallower than the first region in terms of depth indicated by depth information of the captured image;
an extension step of duplicating pixels that constitute the first region and are positioned in a neighborhood of a boundary between the first region and the second region, onto the neighborhood of the boundary outside the first region, thereby generating an extended region;
a blur processing step of performing blur processing on the extended region and the second region based on the depth of the second region indicated by the depth information; and
a composition step of, after the blur processing, compositing a value of each of pixels constituting the extended region and a value of one of pixels constituting the second region that correspond in position with each other.

9. An imaging apparatus comprising:
an imaging unit having a stereo camera;
a display unit;
a memory configured to store therein a program for blur effect processing and a left image and a right image captured by the stereo camera;
a DSP configured to perform generation processing of generating a depth image indicating depth information for each pixel based on the captured left and right images stored in the memory, and perform the blur effect processing on at least one of the captured left and right images; and
a CPU configured to control processing of storing the left image and the right image captured by the stereo camera in the memory, control processing of causing the DSP to perform the generation processing and the blur effect processing, and control processing of causing the display unit to display a result of the blur effect processing, wherein the blur effect processing comprises:

a separation step of separating a target image into a plurality of regions including a first region and a second region that is shallower than the first region in terms of depth indicated by depth information of the target image;

an extension step of duplicating pixels that constitute the first region and are positioned in a neighborhood of a boundary between the first region and the second region, onto the neighborhood of the boundary outside the first region, thereby generating an extended region;

a blur processing step of performing blur processing on the extended region and the second region based on the depth of the second region indicated by the depth information; and a composition step of, after the blur processing, compositing a value of each of pixels constituting the extended region and a value of one of pixels constituting the second region that correspond in position with each other.

10. An imaging apparatus comprising:

an imaging unit having a monocular camera;

a display unit;

a distance sensor unit configured to measure, for each pixel, a distance to a subject captured by the imaging unit;

a memory configured to store therein a program for blur effect processing, an image captured by the monocular camera, and the distance measured for each pixel by the distance sensor unit;

a DSP configured to perform generation processing of generating a depth image indicating depth information for each pixel based on the captured image stored in the memory and the measured distance for each pixel, and perform the blur effect processing on the captured image; and a CPU configured to control processing of storing the left image and the right image captured by the monocular camera in the memory, control processing of causing the DSP to perform the generation processing and the blur effect processing, and control processing of causing the display unit to display a result of the blur effect processing, wherein the blur effect processing comprises:

a separation step of separating a target image into a plurality of regions including a first region and a second region that is shallower than the first region in terms of depth indicated by depth information of the target image;

an extension step of duplicating pixels that constitute the first region and are positioned in a neighborhood of a boundary between the first region and the second region, onto the neighborhood of the boundary outside the first region, thereby generating an extended region;

a blur processing step of performing blur processing on the extended region and the second region based on the depth of the second region indicated by the depth information; and a composition step of, after the blur processing, compositing a value of each of pixels constituting the extended region and a value of one of pixels constituting the second region that correspond in position with each other.

11. A display apparatus comprising:

a display unit;

a memory configured to store therein a program for blur effect processing, a captured image, and a depth image indicating depth information for each pixel of the captured image;

a DSP configured to perform the blur effect processing on the captured image; and a CPU configured to control processing of causing the DSP to perform the blur effect processing, and control processing of causing the display unit to display a result of the blur effect processing, wherein the blur effect processing comprises:

a separation step of separating a target image into a plurality of regions including a first region and a second region that is shallower than the first region in terms of depth indicated by depth information of the target image;

an extension step of duplicating pixels that constitute the first region and are positioned in a neighborhood of a boundary between the first region and the second region, onto the neighborhood of the boundary outside the first region, thereby generating an extended region;

a blur processing step of performing blur processing on the extended region and the second region based on the depth of the second region indicated by the depth information; and a composition step of, after the blur processing, compositing a value of each of pixels constituting the extended region and a value of one of pixels constituting the second region that correspond in position with each other.

12. An image processing apparatus comprising:

a blur processing unit configured to, based on a captured image and a depth image indicating depth information of the captured image, perform blur processing on the captured image, thereby generating a blurred image; and a repetition unit configured to, based on the generated blurred image and the depth information, repeatedly perform the blur effect processing on the generated blurred image to generate a new blurred image until a number of repetitions of the blur effect processing reaches a predetermined number, wherein the blur effect processing unit includes:

a separation unit configured to separate a target image into a plurality of regions including a first region and a second region that is shallower than the first region in terms of depth indicated by depth information of the target image;

an extension unit configured to duplicate pixels that constitute the first region and are positioned in a neighborhood of a boundary between the first region and the second region, onto the neighborhood of the boundary outside the first region, thereby generating an extended region;

a blur processing unit configured to perform blur processing on the extended region and the second region based on the depth of the second region indicated by the depth information; and a composition unit configured to, after the blur processing, composite a value of each of pixels constituting the extended region and a value of one of pixels constituting the second region that correspond in position with each other.

13. A non-transitory computer readable recording medium having recorded therein a program that causes a computer to perform predetermined image processing, the predetermined image processing comprising:
- a blur effect processing step of, based on a captured image and a depth image indicating depth information of the captured image, performing blur effect processing on the captured image, thereby generating a blurred image; and
- a repetition step of, based on the generated blurred image and the depth information, repeatedly performing the blur effect processing on the generated blurred image to generate a new blurred image until a number of repetitions of the blur effect processing reaches a predetermined number, wherein the blur effect processing comprises:
- a separation step of separating a target image into a plurality of regions including a first region and a second region that is shallower than the first region in terms of depth indicated by depth information of the target image;
- an extension step of duplicating pixels that constitute the first region and are positioned in a neighborhood of a boundary between the first region and the second region, onto the neighborhood of the boundary outside the first region, thereby generating an extended region;
- a blur processing step of performing blur processing on the extended region and the second region based on the depth of the second region indicated by the depth information; and
- a composition step of, after the blur processing, compositing a value of each of pixels constituting the extended region and a value of one of pixels constituting the second region that correspond in position with each other.

* * * * *